United States Patent
Clauss et al.

[11] Patent Number: 5,887,432
[45] Date of Patent: Mar. 30, 1999

[54] BRAKE MASTER CYLINDER WITH AXIALLY MOVABLE SLEEVE

[75] Inventors: Johannes Clauss, Bietigheim-Bissingen; Martina Richerzhagen, Clausthal-Zellerfeld; Harry Troester, Tamm, all of Germany

[73] Assignee: Daimler-Benz AG, Stuttgart, Germany

[21] Appl. No.: 901,798

[22] Filed: Jul. 28, 1997

[30] Foreign Application Priority Data

Jul. 26, 1996 [DE] Germany .................. 196 30 219.6

[51] Int. Cl.⁶ ............................................. B60T 11/20
[52] U.S. Cl. .................. 60/562; 60/581; 60/589; 60/591
[58] Field of Search .................. 60/597.1, 562, 60/582, 581, 585, 589, 591

[56] References Cited

U.S. PATENT DOCUMENTS 5,031,968  7/1991  Takata .................................. 60/582 X

FOREIGN PATENT DOCUMENTS

| 2 026 756 | 12/1970 | Germany . | |
|---|---|---|---|
| 195 43 698.9 | 11/1995 | Germany . | |
| 0160753 | 10/1982 | Japan | 60/582 |
| 1333050 | 10/1973 | United Kingdom | 60/582 |

Primary Examiner—Hoang Nguyen
Attorney, Agent, or Firm—Evenson, McKeown, Edwards & Lenahan P.L.L.C.

[57] ABSTRACT

A brake master cylinder with a plunger piston is acted upon by a brake linkage. A floating piston is arranged between two working spaces and separates the first and the second working space fluidically from one another. Each of the two working spaces opens into a main brake circuit, and the floating piston is axially movable in the brake master cylinder. A sleeve is axially movable in the brake master cylinder and is provided at least between the floating piston and the wall of the brake master cylinder. The sleeve and the wall of the brake master cylinder each have an opening which, in interaction, connect the first working space, formed by the floating piston and the plunger piston, to a displacement passage at least in the case of a movement of the floating piston into a first position in the direction of a brake actuation. With a movement of the floating piston beyond the first position, the sleeve is moved axially and separates the first working space from the displacement passage.

13 Claims, 6 Drawing Sheets

BRAKE MASTER CYLINDER WITH AXIALLY MOVABLE SLEEVE

BACKGROUND AND SUMMARY OF THE INVENTION

This application claims the priority of 196 30 219.6, the disclosure of which is expressly incorporated by reference herein.

The present invention relates to a brake master cylinder with a plunger piston acted upon by a brake linkage, with a floating piston which is arranged between two working spaces and separates the first and the second working space fluidically from one another.

Various configurations of a brake master cylinder are described in unpublished application Ser. No. P 195 43 698.9-21. In normal brake operation, these configurations permit decoupling of the brake pressure built up in the vehicle brake circuits by the actuation of the brake pedal. On one hand, the driver is provided with a sense of braking by way of a so-called pedal-travel simulator, in that the brake pedal operates against a corresponding counterpressure, and, on the other hand, a safety function is ensured in that, namely, in the event of failure of the electrics or hydraulics which provide the brake pressure in normal operation, the brake pressure built up by the brake pedal can flow out of the brake master cylinder into the brake circuits of the vehicle.

Such a brake master cylinder has a plunger piston which is acted upon by a brake linkage. A floating piston is arranged between two working spaces and separates the first and the second working space fluidically from one another. Each of the two working spaces open into a main brake circuit, and the floating piston is axially movable in the brake master cylinder.

German Offenlegungsschrift 2,026,756 provides, between the floating piston and the wall of the brake master cylinder, a sleeve which is axially movable in the brake master cylinder for the purpose of achieving a different object. The sleeve and the wall of the brake master cylinder each have an opening. This arrangement represents a multi-circuit brake system whose brake circuits are constructed independently of one another in order to allow the other brake circuit to function unimpaired thereby in the event of a failure of one brake circuit. The conditions and prerequisites for the movement of this sleeve and for the state in which the openings in the sleeve and the wall lie one above the other are fundamentally different from those described below in connection with the present invention.

It is an object of the present invention to provide for the improved functioning of a pedal-travel simulator.

To achieve this object, the present invention provides a brake master cylinder in which a sleeve is axially movable in the brake master cylinder and is provided at least between the floating piston and the wall of the brake master cylinder. The sleeve and the wall of the brake master cylinder each have an opening which, in interaction, connect the first working space, formed by the floating piston and the plunger piston, to a displacement passage at least in the case of a movement of the floating piston into a first position in the direction of a brake actuation. In the event of a movement of the floating piston beyond the first position, the sleeve is moved axially and separates the first working space from the displacement passage.

Given normal functioning of the brake system, the connection between the first working space and the displacement passage can be permanent or can be established only, when the brake is actuated, i.e. when the floating piston is moved into the first position, in accordance in that case with the normal functioning of the brake system.

An advantage of the present invention is that functioning can be achieved with comparatively little expenditure on components by using the sleeve in the brake master cylinder with corresponding seals.

In one advantageous configuration of a brake master cylinder, the sleeve is pressed against an abutment by a spring force, with the openings in the sleeve and the wall of the brake master cylinder interacting in this position. Furthermore, the sleeve and the floating piston are configured such that the sleeve is taken along by the floating, piston counter to the spring force when the floating piston is moved beyond the first position in a brake actuation direction.

With normal functioning of the brake system, the main brake circuits are separated from the brake master cylinder by controllable valves or the like in the closed position of the latter. Because of the volume (then closed off) of the second working space of the brake master cylinder, the second space being formed by the floating piston and the wall of the brake master cylinder, a comparatively high. pressure is built up in the second working space given a certain movement of the floating piston in the direction of a brake actuation when the brake is actuated. This pressure prevents a further movement of the floating piston in the direction of a brake actuation. In this situation, the first working space of the brake master cylinder, with the first working space being formed by the floating piston and the plunger piston, is connected to the displacement passage via the interacting openings in the sleeve and the wall of the brake master cylinder.

If there is a disturbance in the normal brake functioning, due, for example, to an electrical failure, the controllable valves between the brake master cylinder and the main brake circuits are in the open position. As a result, the pressure build-up in the second working space of the magnitude encountered with a closed controllable valve is prevented. The floating piston can thus move further and take the sleeve along in the process. This is achieved, for example, by positive engagement between the floating piston and the sleeve, with this positive engagement existing when the floating piston moves to a corresponding extent. The present invention also contemplates, however, that a spring with a suitably selected spring constant can be used to achieve this function. Because of the movement of the sleeve, the opening in the sleeve and the opening in the wall of the brake master cylinder then no longer interact. The result is that the first working space is no longer connected to the displacement passage. Thus, a brake pressure built up in the first working space with the movement of the plunger piston then propagates via the opened controllable valve into the main brake circuit assigned to this first working space.

In another embodiment according to the invention of a brake master cylinder, a sleeve which is axially movable in the brake master cylinder is provided at least between the floating piston and the wall of the brake master cylinder. The sleeve and the wall of the brake master cylinder each have an opening which, in interaction, connect the first working space formed by the floating piston and the plunger piston to a displacement passage at least in the case of a movement of the floating piston into a first position in the direction of a brake actuation. The sleeve is acted upon by a spring force, with the result that it is moved axially when the pressure in the second working space falls as a result of the opening of the valve of the main brake circuit assigned to this second working space. The first working space is separated from the displacement passage as a result of the sleeve movement.

With normal functioning of the brake system, the connection between the first working space and the displacement passage can be permanent or be established only when the brake is actuated, i.e. when the floating piston is moved into the first position, this then being in accordance with the normal functioning of the brake system. Control of the movement of the sleeve is performed directly by the pressure conditions in the second working space of the brake master cylinder. When the pressure in the second working space falls because of the opening of the controllable valve which connects this second working space to the associated main brake circuit, the sleeve is then moved as a result of the spring force, so that the first working space of the brake master cylinder is separated from the displacement passage.

In another advantageous configuration of a brake master cylinder of the above-mentioned type, the spring force to which the sleeve is subjected is supported on the plunger piston. This approach ensures that a movement of the sleeve in the sense of a separation of the first working space from the displacement passage takes place only when the brake is actuated. This proves particularly advantageous when the sleeve has at least one further opening, whereby one of the working chambers is connected to a brake fluid container via a corresponding opening in the wall of the brake master cylinder. Thereby, it can be ensured that the snifter opening is open when the brake is unactuated, allowing brake fluid to be balanced.

In another configuration of the present invention, a brake fluid container is connected to the displacement passage via a nonreturn valve. The nonreturn valve closes in the direction of the brake fluid container, and the opening in the sleeve is connected to the second working space in the position of the floating piston which corresponds to an unactuated brake. The opening in the sleeve then is sealed off from the first working space, and the opening in the sleeve is connected to the first working space in the first position of the floating piston, with the opening in the sleeve then being sealed off from the second working space.

Such a configuration is advantageous in that the opening in the sleeve and the opening in the wall of the brake master cylinder interact such that, with the brake unactuated, a connection is established between the second working space of the brake master cylinder and the brake fluid container. That is, the openings then act as a snifter opening for the second working space and, with the brake actuated, the first working space is connected to the displacement passage via the openings. These openings thereby exercise a twin function. Thereby, the present invention minimizes expenditure as regards sealing the openings.

In yet another configuration of the present invention, at least one further brake fluid container is connected to one of the two working chambers by at least one further opening in the sleeve, which interacts with at least one further opening in the wall of the brake master cylinder. The sleeve can be advantageously configured in a corresponding manner, so that the connection between the working spaces of the brake master cylinder and the brake fluid containers can likewise be established via openings in the sleeve.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
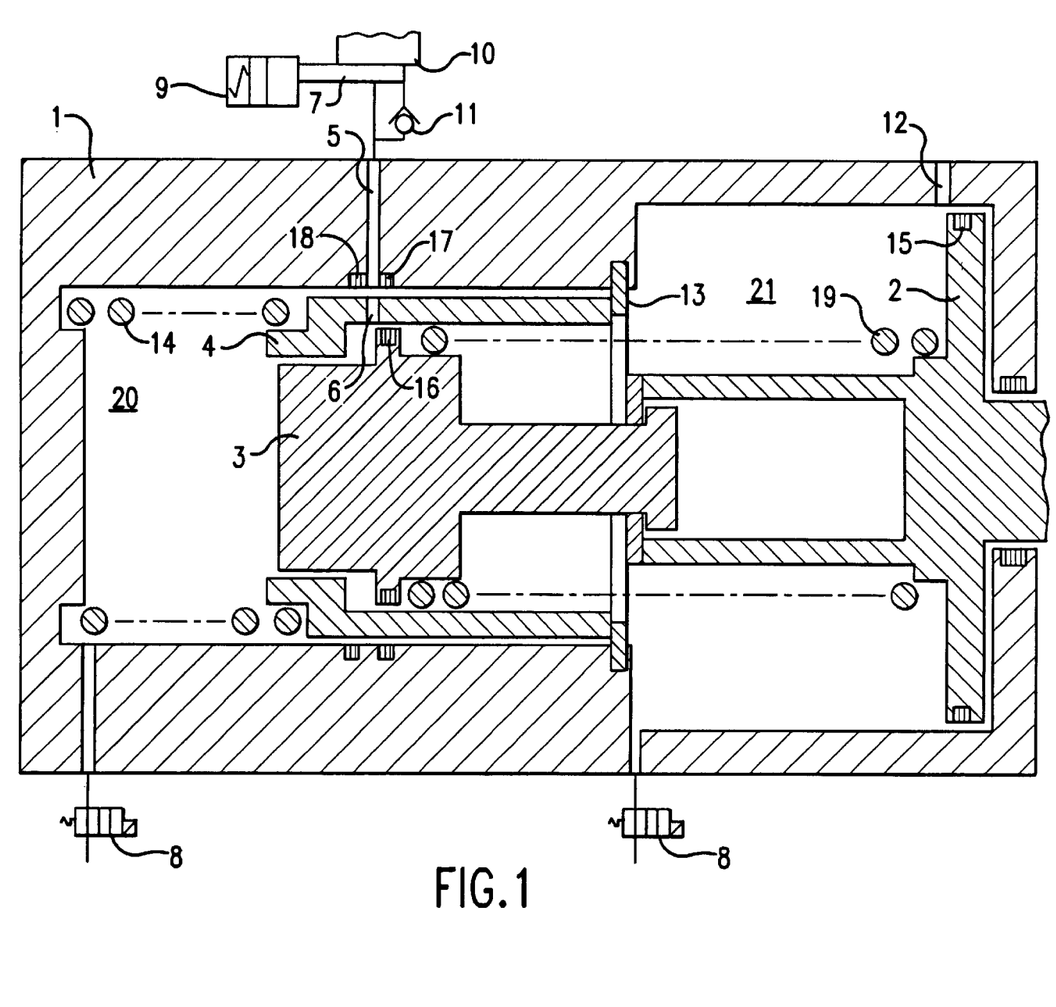
FIG. 1 is a schematic elevational view of a first embodiment of a brake master cylinder of the present invention with the brake unactuated.

FIG. 1 shows a configuration of a brake master cylinder 1 having a plunger piston 2 and a floating piston 3. The floating piston 3 is supported on the plunger piston 2 by a spring 19. As a result, a movement of the plunger piston 2, e.g. a brake actuation, is thus transmitted to the floating piston 3 by the spring 19. When the brake is released again, the floating piston 3 is forcibly returned by the plunger piston 2.

A sleeve 4 is provided between the floating piston 3 and the wall of the brake master cylinder 1. This sleeve 4 is pushed against an abutment 13 by a spring 14. The sleeve 4 has an opening 6 which, in the illustrated position of the sleeve 4, interacts with an opening 5 in the wall of the brake master cylinder 1. A displacement passage 7 is furthermore connected to the opening 5. An accumulator 9 is connected to this displacement passage 7. A branch furthermore leads from the displacement passage 7 to a brake fluid container 10, and is provided with a nonreturn valve 11 which closes in the direction of flow to the brake fluid container 10.

A further opening 12 is furthermore provided in the wall of the brake master cylinder 1, opening into the first working space 21 of the brake master cylinder 1. This first working space 21 of the brake master cylinder 1 is bounded, on one hand, by the floating piston 3 and, on the other hand, by the plunger piston 2. A conventional brake fluid container can be connected to the opening 12. The first working space 21 is sealed off by seals 15, 16 and 17. The opening 12 serves as a snifter opening for the first working space 21 of the brake master cylinder 1 and it is thus possible for additional brake fluid to flow via this opening into the main brake circuit assigned to this first working space 21 when the brake is not actuated.

In the position of the floating piston 3 illustrated in FIG. 1, i.e. with the brake unactuated, additional brake fluid can flow out of the brake fluid container 10 into the second working space 20 of the brake master cylinder 1 via the openings 5, 6. The seals 16, 17 seal off the two working spaces 20, 21 and hence also the two main brake circuits from one another. As also illustrated in FIG. 1, the controllable valves 8 are in the deenergized state. That is, these controllable valves 8 enter this state even in the case of a power failure, and in that state the two main brake circuits are each connected with the associated working chamber 20, 21, respectively, of the brake master cylinder 1. This is only true, however, when there is a malfunction of the brake or when the brake is not actuated. When the brake is functioning properly, the two controllable valves 8 shut off the main brake circuits from the respective working spaces 20, 21 of the brake master cylinder when the brake is actuated. A desired value for the brake pressure is then specified by the brake pedal or in some other way, on the basis of the driving situation of the vehicle for example, and this brake pressure is then produced by the brake system, which is of active configuration. The position of the valves 8 when the brake is unactuated ensures that additional brake fluid can flow into the two main brake circuits via the snifter openings.

Figure 2:
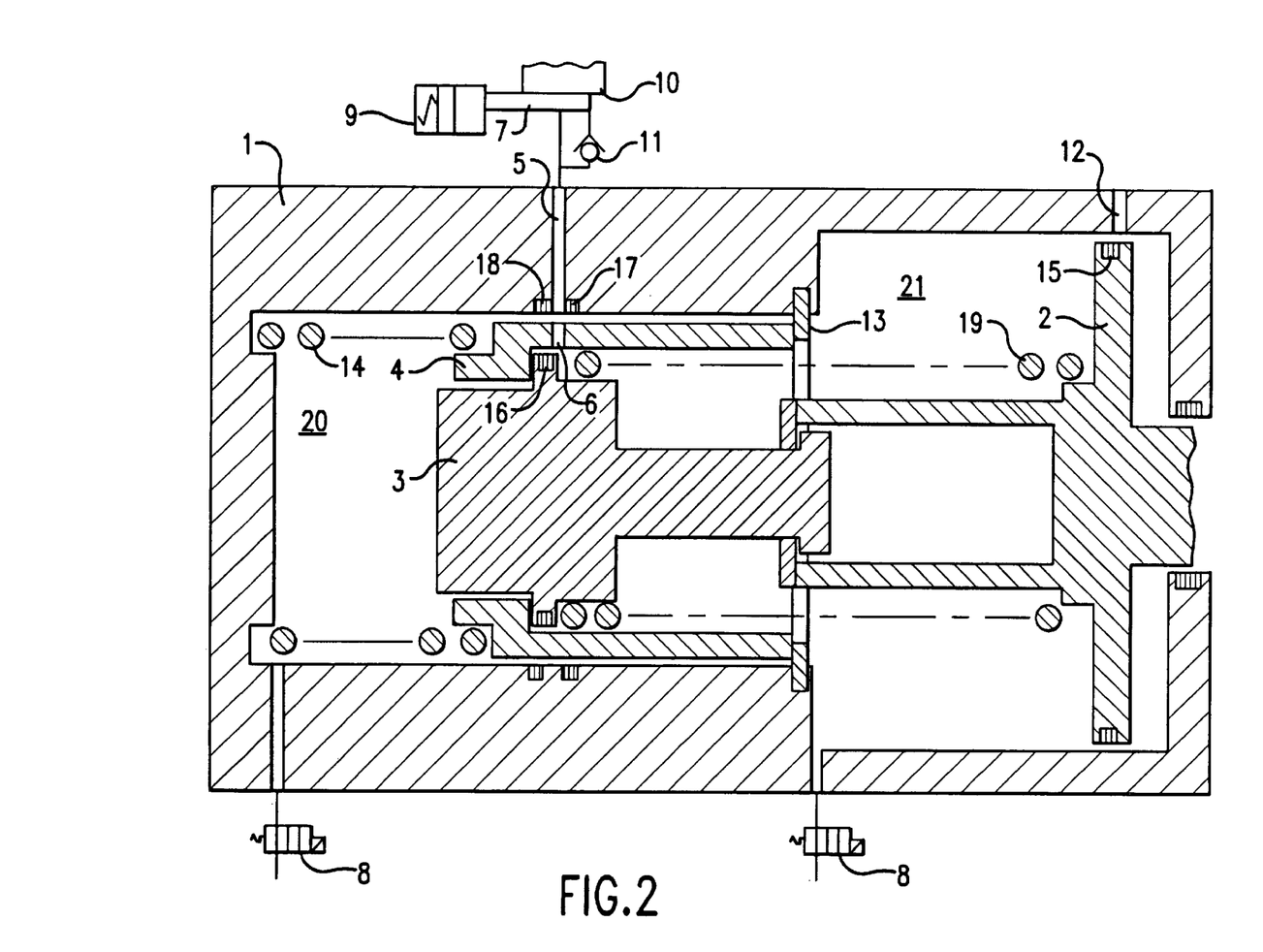
FIG. 2 is a view similar to FIG. 1 but with the brake actuated, and the brake system functional.

FIG. 2 illustrates the position of the components of the brake master cylinder 1 with the brake actuated and the brake functional. The two controllable valves 8 are initially activated. That is, the two main brake circuits are separated from the respective working spaces 20, 21 of the brake master cylinder 1. The plunger piston 2 is moved in the brake actuation direction. As a result, the seal 15 seals off the snifter opening 12 of the first working chamber 21. It is thus impossible for any brake fluid to flow in or out through this opening 12.

Due to the spring stress of the spring 19, the floating piston 3 is likewise moved in the direction of a brake actuation. The volume of the second working chamber 20 of the brake master cylinder 1 is closed off by the closed controllable valve 8. Just a comparatively small reduction in the volume by the movement of the floating piston 3 into the first position shown thus effects a comparatively sharp rise in the pressure in the volume or chamber 20. The seal 16 seals off the second working chamber 20 from the displacement passage 7 and the brake fluid container 10, thereby preventing brake fluid from flowing either into or out of the second working chamber 20. The large pressure rise in the second working chamber 20 prevents a further movement of the floating piston 3.

The openings 5, 6, which continue to interact, now connect the first working chamber 21 to the displacement passage 7. Due to the actuation of the brake pedal and the associated movement of the plunger piston 2 of the brake master cylinder, an upstream pressure arises in the first working chamber 21, with the result that the nonreturn valve 11 closes. The first working chamber 21 is thus connected to the accumulator 9 via the displacement passage 7.

If now the brake pedal is actuated further than shown in FIG. 2, the plunger piston 2 thus moves further in the direction of a brake actuation. During this process, there is only a comparatively moderate pressure rise in the first working chamber 21 because the brake fluid can escape into the accumulator 9 via the displacement passage 7. Although the spring force of the spring 19 on the floating piston 3 also increases with the further movement of the plunger piston 2, the high pressure in the closed-off second working space 20 prevents further movement of the floating piston 3.

In the illustrated braking operation with a functional brake system, the sleeve 4 thus remains in the position in which its opening 6 interacts with the opening 5 in the wall of the brake master cylinder 1 and connects the first working chamber 21 to the displacement passage 7. With the connection of the first working chamber 21 to the displacement passage 7 and the accumulator 9, the vehicle driver is provided with a good sense of braking by a pedaltravel simulation, even when the brake master cylinder has been separated from the main brake circuits.

Figure 3:
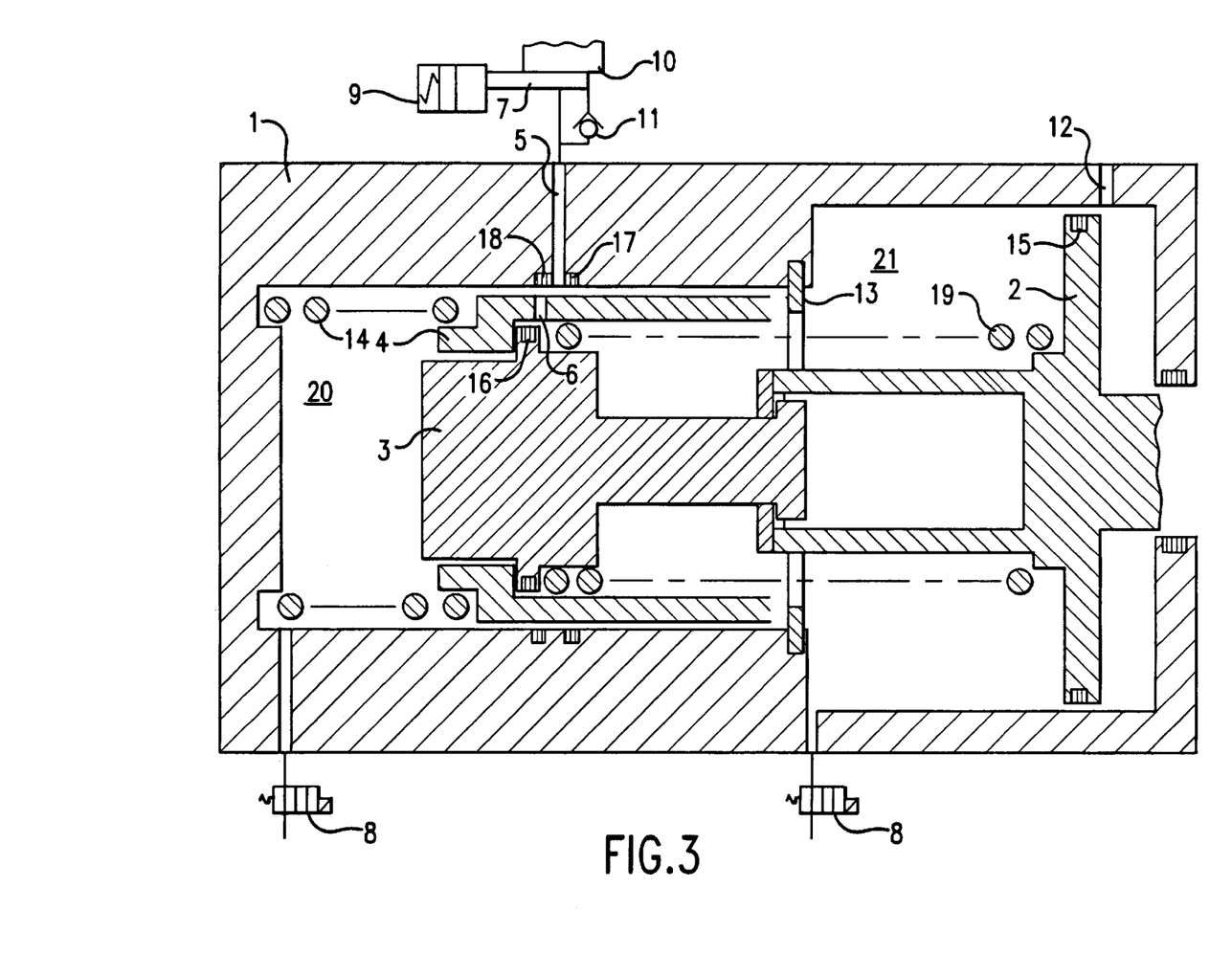
FIG. 3 is a view similar to FIGS. 1 and 2 but with the brake actuated and the brake system nonfunctional.

FIG. 3 shows the brake master cylinder 1 with a brake system that is not functioning properly. The two controllable valves 8 have here been switched to the open position. The two main brake circuits are then connected to the respective working chamber 20, 21 of the brake master cylinder 1.

Because of the connection of the second working chamber 20 to the associated main brake circuit, the floating piston 3 can move beyond the first position shown in FIG. 2 because the then prevailing pressure conditions in the second working chamber 20.

A nose formed in the region of the seal 16 and a corresponding formation of the sleeve 4 in this region causes the floating piston 3 to engage the sleeve 4 and forcibly takes the latter along counter to the spring force of the spring 14. The sleeve 4 thus moves away from the abutment 13.

The opening 6 in the sleeve 4 and the opening 5 in the wall of the brake master cylinder 1 then no longer interact due to the displacement of the sleeve 4. The displacement passage 7 is sealed off by the seals 17, 18 and the sleeve 4 from both working chambers 20, 21 of the brake master cylinder 1. The brake system thus functions like a conventional brake system.

Figure 4:
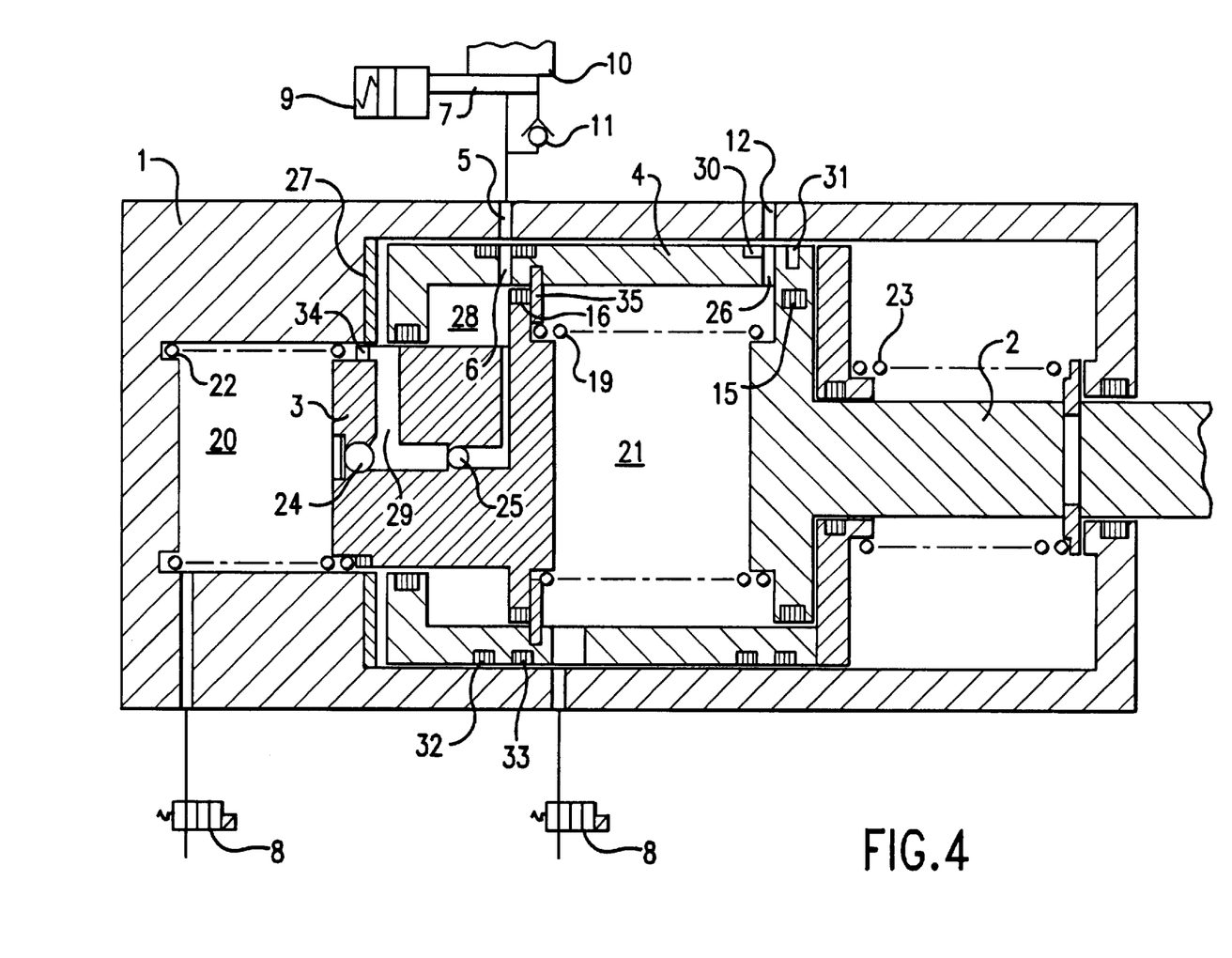
FIG. 4 is a schematic elevational view of a second configuration of a brake master cylinder in accordance with the present invention with the brake unactuated.

FIG. 4 shows the second embodiment of a brake master cylinder 1 with the brake unactuated. Here, reference numerals identical with those used in FIG. 1 denote the same components as in the first embodiment both structurally and functionally, and thus need not be described in further detail except as follows.

The brake master cylinder 1 again contains a plunger piston 2 and a floating piston 3. The plunger piston 2 acts on the floating piston 3 by a spring 19. If the plunger piston 2 is not moved, e.g. a brake actuation, the floating piston 3 is held in its rest position by the force of spring 22 in conjunction with the spring 19.

A sleeve 4 is provided between the floating piston 3 and the wall of the brake master cylinder 1 and has an opening 6 which interacts with the opening 5 in the wall of the brake master cylinder 1 when the sleeve 4 is in the position illustrated in FIG. 4. Via the openings 5, 6, a displacement passage 7 is then connected to the brake master cylinder 1. An accumulator is provided at the end of this displacement passage 7. A brake fluid container 10 is furthermore connected to the displacement passage 7 via a nonreturn valve 11 which closes in the direction of the brake fluid container 10.

A further opening 12 is provided in the wall of the brake master cylinder 1 and, in the position of the sleeve 4 shown in FIG. 4, this further opening 12 interacts with an opening 26 in the sleeve 4 and opens into the first working space 21 of the brake master cylinder, which first working space is situated between the plunger piston 2 and the floating piston 3. A conventional brake fluid container can be connected to this opening 12. The first working space 21 is sealed off by the seals 15, 16, 30 and 31. Together, the openings 12 and 26 serve, in interaction, as a snifter opening for the first working space 21 of the brake master cylinder 1. Thereby, additional brake fluid can flow, via this opening, into the main brake circuit assigned to this first working space 21 when the brake is not actuated.

In the position of the floating piston 3 illustrated in FIG. 4, with the brake unactuated, additional brake fluid can flow out of the brake fluid container 10 into the second working space 20 of the brake master cylinder 1 via the openings 5 and 6. The nonreturn valves 11, 25 and 24 open in this direction. The seals 16, 32, 33 and 34 seal off the two working spaces 20 and 21 and hence also the two main brake circuits from one another. The sleeve 4 is held in the position illustrated counter to the force of the spring 23 by the floating piston 3 in interaction with the stop 35.

As also illustrated in FIG. 4, the controllable valves 8 are in the deenergized state. That is, these controllable valves 8 enter this state even in the event of a power failure and in that state the two main brake circuits are each connected with the associated working chamber 20, 21 respectively of the brake master cylinder 1. This is only the case, however, when there is a malfunction of the brake or when the brake is not actuated. When the brake is functioning properly, the two controllable valves 8 shut off the main brake circuits from the respective working spaces 20, 21 of the brake master cylinder 1 when the brake is actuated. A desired value for the brake pressure is then specified by the brake pedal or in some other way, on the basis, for example, of the driving situation of the vehicle, and this brake pressure then is produced by the brake system which is of active configuration.

Figure 5:
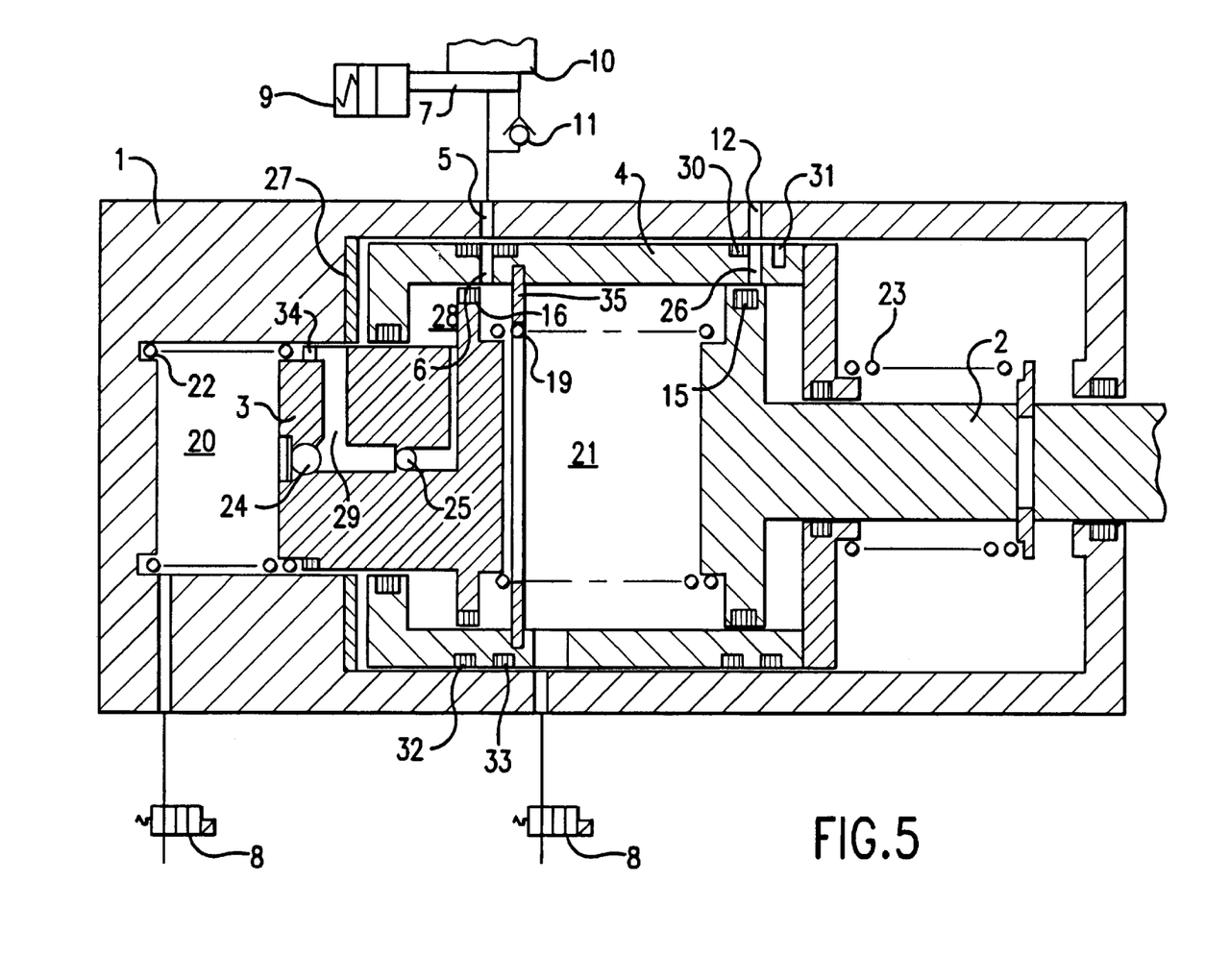
FIG. 5 is a view similar to FIG. 4 but with the brake actuated and the brake system functional.

In FIG. 5, the second embodiment of a brake master cylinder 1 with the brake actuated and the brake system functional. That is, the two controllable valves 8 are initially activated. The two main brake circuits are thereby separated from the respective working spaces 20, 21 of the brake master cylinder 1. The plunger piston 2 has been moved in the direction of a brake actuation. As a result, the seal 15 seals off the opening 12 in the wall of the brake master cylinder 1 and opening 26 in the sleeve 4, which interact as snifter opening, from the first working chamber 21 of the brake master cylinder 1. Consequently, no brake fluid can flow in or out through this snifter opening.

Due to the spring stress of the spring 19, the floating piston 3 is likewise moved in the direction of a brake actuation. The volume of the second working chamber 20 of the brake master cylinder 1 is closed off by the closed controllable valve 8. Just a comparatively small reduction in the volume by the movement of the floating piston 3 into the first position shown thus effects a comparatively sharp rise in the pressure in the volume or chamber. The seal 34 and the nonreturn valve 24, which closes owing to the pressure, seal off the second working chamber 20 from the displacement passage 7 and the brake fluid container 10. Thereby, brake fluid is prevented from flowing either into or out of the second working chamber 20. The large pressure rise in the second working chamber 20 prevents a further movement of the floating piston 3.

Because of the movement of the floating piston 3, the first volume 28 also decreases in size. As a result, a pressure rise occurs in this first volume 28, this being present also the same magnitude in the second volume 29 because the nonreturn valve 25 permits a pressure equalization if there is an excess pressure in the first volume 28. The pressure in the volume 28 acts as a driving force on the sleeve 4; this force, just like the force of the spring 23; moves the sleeve 24 in the direction of the stop 27 of the sleeve 4. However, by virtue of the pressure equalization the same pressure is also present in the second volume 29. This pressure counteracts such a movement. Because the force of the spring 23 can be preselected by an appropriate choice of a suitable spring, and the pressure in the second volume 29 acts on a larger surface of the sleeve 4 than the pressure in the first volume 28, the sleeve 4 is held in the position illustrated in FIG. 5.

The movement of the floating piston 3 relative to the sleeve 4 allows the seal 16 to seal off the second working chamber 20 from the displacement passage 7.

The openings 5, 6, which continue to interact, now connect the first working chamber 21 to the displacement passage 7. The actuation of the brake pedal and the associated movement of the plunger piston 2 of the brake master cylinder creates an upstream pressure in the first working chamber 21, with the result that the nonreturn valve 11 closes. The first working chamber 21 is thus connected to the accumulator 9 via the displacement passage 7.

If the brake pedal is actuated further than shown in the example in FIG. 5, the plunger piston 2 thus moves further in the direction of a brake actuation. During this process, there is only a comparatively moderate pressure rise in the first working chamber 21 because the brake fluid can escape into the accumulator 9 via the displacement passage 7.

Although the spring force of the spring 19 on the floating piston 3 also increases with the further movement of the plunger piston 2, the high pressure in the closedoff second working space 20 prevents further movement of the floating piston 3. With appropriate dimensioning of the spring 23, the sleeve 4 is prevented from moving from the position illustrated under the pressure conditions described above in conjunction with FIG. 5, even if there is a further movement of the plunger piston 2.

In the illustrated braking operation with a functional brake system, the sleeve 4 thus remains in the position in which its opening 6 interacts with the opening 5 in the wall of the brake master cylinder 1 and connects the first working chamber 21 to the displacement passage 7. The connection of the first working chamber 21 to the displacement passage 7 and the accumulator 9 provides the driver with a sense of braking by a pedal-travel simulation, even when the brake master cylinder 1 has been separated from the main brake circuits.

Figure 6:
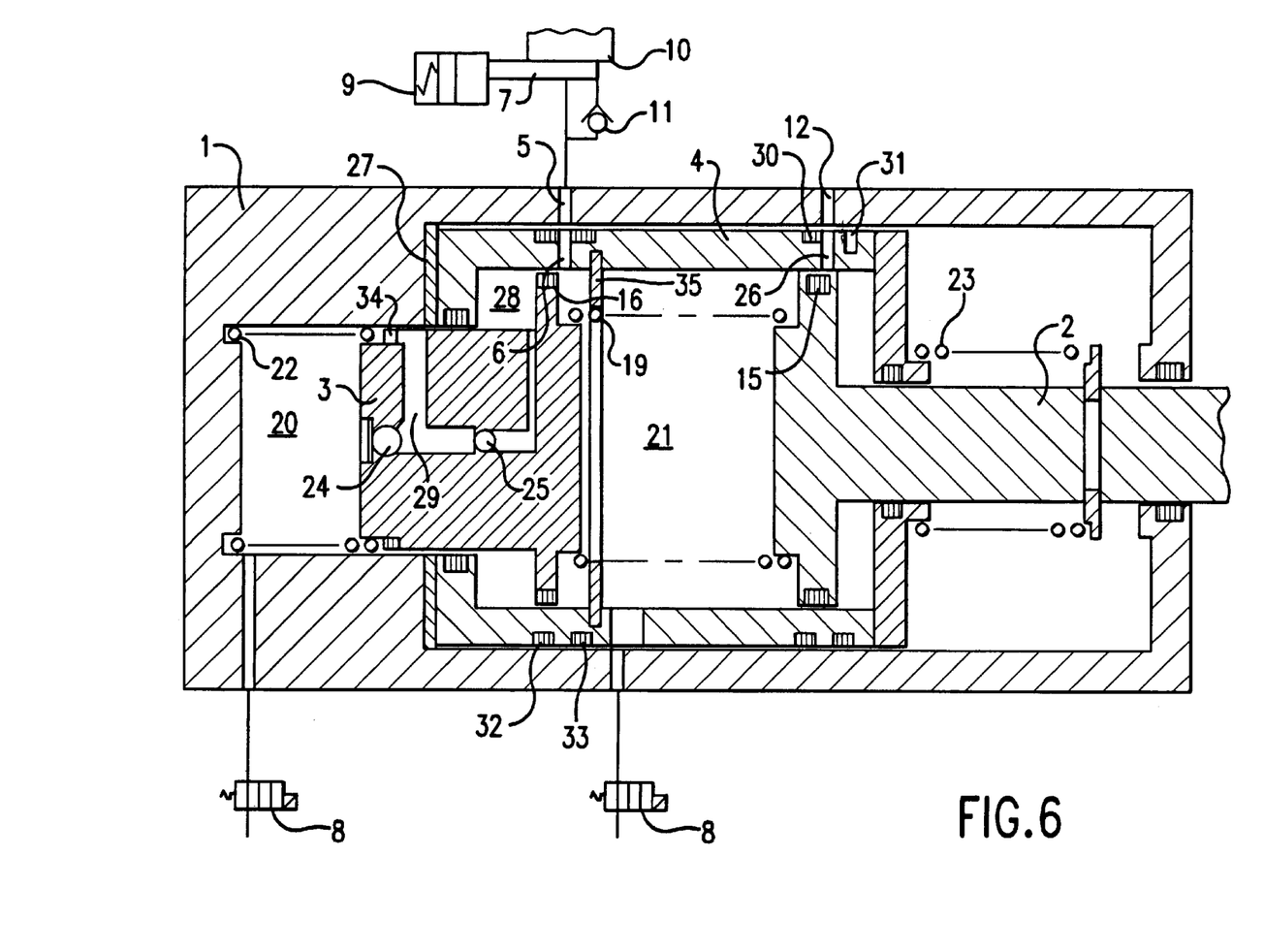
FIG. 6 is a view similar to FIGS. 4 and 5 but with the brake actuated and the brake system nonfunctional.

FIG. 6 illustrates the second configuration of a brake master cylinder 1 with the brake actuated and the brake system nonfunctional. The two controllable valves 8 have here been switched to the open position. The two main brake circuits are then connected to the respective working chamber 20, 21 of the brake master cylinder 1.

Because of the connection of the second working chamber 20 to the associated main brake circuit, the floating piston 3 can move beyond the first position shown in FIG. 5 by virtue of the then prevailing pressure conditions in the second working chamber 20.

The falling pressure in the second working chamber 20. of the brake master cylinder 1 causes a pressure reduction in the first volume 28 and the second volume 29 by virtue of the nonreturn valves 24 and 25, which open in this direction. As a result, the force acting on the sleeve 4 counter to the spring 23, which has held this sleeve in the position shown in FIG. 5, falls. Due to the force of the spring 23, the sleeve 4 thus moves until it strikes the stop 27.

The opening 6 in the sleeve 4 and the opening 5 in the wall of the brake master cylinder 1 then no longer interact due to the displacement of the sleeve 4. The displacement passage 7 is sealed off by the seals 32, 33 and the sleeve 4 from both working chambers 20 and 21 of the brake master cylinder 1. The brake system thus functions like a conventional brake system.

In both of the above-described embodiments, the openings 6, 5 have a dual function with the brake unactuated (as a snifter opening) and with the brake actuated and the brake system functioning normally (as a connection to an accumulator as a pedal-travel simulator). It is, of course, also within the scope of the present invention to provide separate openings for each of these functions.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Brake master cylinder, comprising a plunger piston acted upon by a brake linkage, a floating piston axially movably arranged in the master cylinder between first and second working spaces opening into a main brake circuit, of the master cylinder and separating the first and the second working spaces fluidically from one another, a sleeve axially movably arranged in the brake master cylinder at least between the floating piston and a wall of the brake master cylinder, the sleeve and the wall of the brake master cylinder each having an opening which interact and connect the first working space, formed by the floating piston and the plunger piston, to a displacement passage at least in the event of a movement of the floating piston into a first position in a brake actuation direction, and, in the event of a movement of the floating piston beyond the first position, the sleeve being arranged to be moved axially and thereby separate the first working space from the displacement passage.

2. The brake master cylinder according to claim 1, wherein the sleeve is configured to be pressed against an abutment by a spring force, in which the openings in the sleeve and the wall of the brake master cylinder interact, and the sleeve and the floating piston are configured such that the sleeve is moved along by the floating piston counter to the spring force when the floating piston is moved beyond the first position in the brake actuation direction.

3. Brake master cylinder comprising a plunger piston configured to be acted upon by a brake linkage, a floating piston axially movably arranged in the master cylinder between first and second working spaces opening into a main brake circuit, and separating the first and the second working spaces fluidically from one another, a sleeve axially movably arranged in the brake master cylinder at least between the floating piston and a wall of the brake master cylinder, the sleeve and the wall of the brake master cylinder each having an opening, which interact and connect the first working space formed by the floating piston and the plunger piston to a displacement passage at least in the event of a movement of the floating piston into a first position in a brake actuation direction, and the sleeve being subjected to a spring force, whereby the sleeve is moved axially when the pressure in the second working space falls as a result of the opening of a valve of the main brake circuit assigned to this second working space, and the first working space being separated from the displacement passage as a result of the movement of the sleeve.

4. The brake master cylinder according to claim 3, wherein the spring force to which the sleeve is subjected is supported on the plunger piston.

5. The brake master cylinder according to claim 1, wherein a brake fluid container is connected to the displacement passage via a nonreturn valve closing in the direction of the brake fluid container, the opening in the sleeve arranged to be connected to the second working space in the position of the floating piston which corresponds to an unactuated brake and thereby sealed off from the first working space, and the opening in the sleeve further arranged to be connected to the first working space in the first position of the floating piston, and thereby sealed off from the second working space.

6. The brake master cylinder according to claim 5, wherein the sleeve is configured to be pressed against an abutment by a spring force, in which the openings in the sleeve and the wall of the brake master cylinder interact, and the sleeve and the floating piston are configured such that the sleeve is moved along by the floating piston counter to the spring force when the floating piston is moved beyond the first position in the brake actuation direction.

7. The brake master cylinder according to claim 3, wherein a brake fluid container is connected to the displacement passage via a nonreturn valve closing in the direction of the brake fluid container, the opening in the sleeve arranged to be connected to the second working space in the position of the floating piston which corresponds to an unactuated brake and thereby sealed off from the first working space, and the opening in the sleeve further arranged to be connected to the first working space in the first position of the floating piston, and thereby sealed off from the second working space.

8. The brake master cylinder according to claim 7, wherein the spring force to which the sleeve is subjected is supported on the plunger piston.

9. The brake master cylinder according to claim 1, wherein at least one further opening is provided in the sleeve to connect at least one further brake fluid container to one of the two working chambers the further opening interacting with at least one further opening in the wall of the brake master cylinder.

10. The brake master cylinder according to claim 9, wherein the sleeve is configured to be pressed against an abutment by a spring force, in which the openings in the sleeve and the wall of the brake master cylinder interact, and the sleeve and the floating piston are configured such that the sleeve is moved along by the floating piston counter to the spring force when the floating piston is moved beyond the first position in the brake actuation direction.

11. The brake master cylinder according to claim 3, wherein at least one further opening is provided in the sleeve to connect at least one further brake fluid container to one of the two working chambers the further opening interacting with at least one further opening in the wall of the brake master cylinder.

12. The brake master cylinder according to claim 11, wherein the spring force to which the sleeve is subjected is supported on the plunger piston.

13. The brake master cylinder according to claim 12, wherein a brake fluid container is connected to the displacement passage via a nonreturn valve closing in the direction of the brake fluid container, the opening in the sleeve arranged to be connected to the second working space in the position of the floating piston which corresponds to an unactuated brake and thereby sealed off from the first working space, and the opening in the sleeve further arranged to be connected to the first working space in the first position of the floating piston, and thereby sealed off from the second working space.

* * * * *